Aug. 30, 1932. J. D. BALDWIN, JR 1,875,209
SECURING MEANS
Filed May 2, 1930
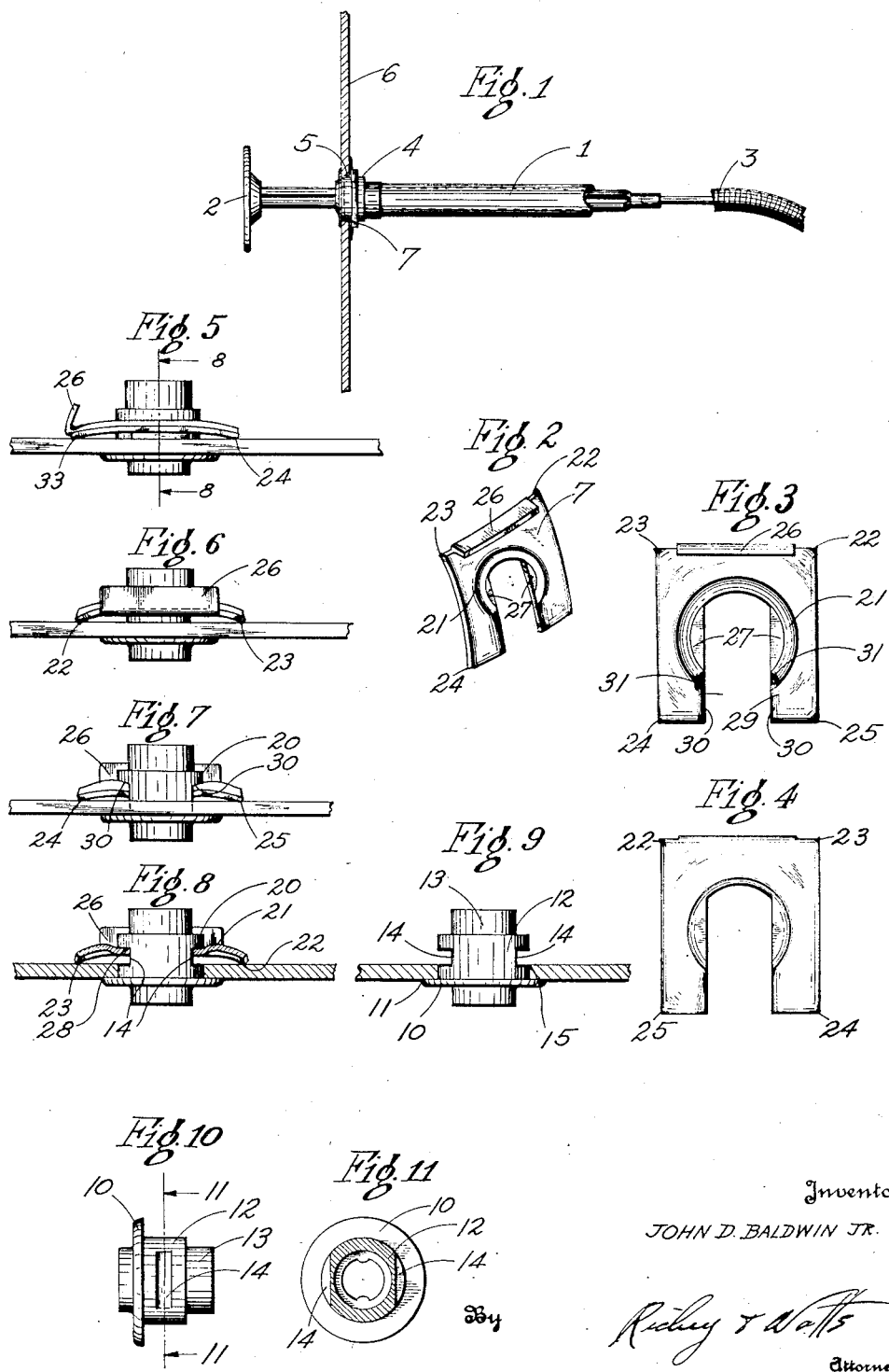

Patented Aug. 30, 1932

1,875,209

UNITED STATES PATENT OFFICE

JOHN D. BALDWIN, JR., OF BRATENAHL, OHIO, ASSIGNOR TO ALBERT J. WEATHERHEAD, JR., OF CLEVELAND, OHIO

SECURING MEANS

Application filed May 2, 1930. Serial No. 449,343.

This invention relates to securing devices and more particularly to a locking means comprising essentially a resilient clip which by virtue of its conformation and other characteristics is capable not only of supplanting a nut and lock washer, but has additional utility both in the fixity which it lends to the parts secured together and in the ease and economy of its manufacture and use.

My invention has been conceived in the solution of a particular problem, namely, that of securing choke control escutcheons to the instrument panel of a motor vehicle, and while I believe I can best illustrate and describe my invention by reference to this specific problem and its solution, I appreciate, and those skilled in the art will appreciate, that my invention has many applications and uses other than the specific one particularly described herein. There are countless places in the automotive field alone wherein parts may be secured together by employing my invention, or obvious modifications thereof. In the application of my invention illustrated and described herein, I have shown the parts to be secured together comprising a plate and a member penetrating the plate, which member it is desired to be held in fixed relation on the plate. It is to be understood that my invention is equally applicable where the parts to be held together comprise a plurality of plates or members through which means such as a bolt is passed and wherein the locking member of my invention serves the purpose heretofore served by a nut and lock washer.

As noted above, the specific problem with which I have been confronted is that of securing a choke control escutcheon to the instrument panel of an automobile. It is therefore among the objects of my invention to secure such an escutcheon by inexpensive means which may be expeditiously assembled and readily removed. Another object is to secure such an escutcheon to an instrument panel with such security that the escutcheon is held non-rotatable relative to the panel. A further object is to secure the escutcheon to the panel after the escutcheon and the whole choke assembly is in place by means which may be moved wholly laterally of the escutcheon and engaged therewith without contacting with or passing over any of the other parts of the control assembly. A further and specific object is to not only firmly secure the escutcheon to the panel but also to make the securing device self-locking so that it will remain in operative position until manually and forcibly removed. A further object is to provide locking means which while being assembled will have a "feel" recognizable by the operator or mechanic which would indicate to him that the assembly is complete and the parts locked with relation to each other.

Other objects include the provision of sharpened down-turned projections which will gouge and engage the plane metallic surface of one of the members to be locked; the formation of the clip in U-shape whereby the legs of the U may twist relative to the base as well as bend when the clip is applied thereby permitting the employment of stouter stock of greater resilience; and the provision of means in the clip by which it can be readily engaged for application or removal.

Other objects will appear from the following description of a preferred form of my invention, reference being had to the accompanying drawing. The essential characteristics are summarized in the claims.

In the drawing, Fig. 1 is a partially broken assembly illustrating the choke control secured to the instrument panel in assembled position; Fig. 2 is a perspective of the resilient locking member; Fig. 3 is a top plan view of the resilient locking member; Fig. 4 is a bottom plan view thereof; Fig. 5 is a side elevation of a locking member in engagement with the escutcheon and the panel; Fig. 6 is a rear elevation of the same parts; Fig. 7 is a front elevation of the same parts; Fig. 8 is a section taken along the lines 8—8 of Fig. 5; Fig. 9 shows the escutcheon in assembled position relative to the panel without the locking member; Fig. 10 is a side elevation of the escutcheon taken at 90° from the view illustrated in Fig. 9; and Fig. 11 is a section taken along the lines 11—11 of Fig. 10.

Referring to the drawing and describing my invention and its specific aspects as applied to securing the choke control escutcheon to the instrument panel of a motor vehicle, I have shown in Fig. 1 the choke control 1 including among other things the pull button 2 connected in a well known manner with a flexible wire and conduit 3, all of which is assembled with an escutcheon member 4 which closely fits and passes through an aperture 5 in the instrument panel 6. Heretofore the shank of the escutcheon has been threaded and such means as a nut and lock washer have been passed over the conduit 3, which may be a yard or more in length, and then threaded onto the shank of the escutcheon to secure it in fixed relation to the panel.

It will be appreciated that this manner of assembly is not only tedious and expensive but also that the rotation of the nut on the shank of the escutcheon tends to rotate the escutcheon in the course of its assembly. It will also be appreciated that rotation of the escutcheon must be resisted, because in many instances the choke button bears indicia which would be illegible if rotated from upright position. In place of the nut and lock washer which has heretofore been used and constituting a vast improvement thereover, I provide simply a locking member 7 which engages the shank of the escutcheon and which as will later appear, may be very readily assembled by a movement parallel to the panel and transversely of the shank of the escutcheon.

Referring to Figs. 9, 10 and 11, the escutcheon has an enlarged head 10, which on its inward face bears against the panel as at 11. Extending inwardly from the head is the cylindrical body or shank 12 which may if desired be reduced at its innermost end, as at 13. The shank or body of the escutcheon is preferably grooved or channeled on opposite sides as at 14, which grooves have preferably parallel bases and parallel top and bottom sides (see Figs. 9 and 11). The grooves are preferably cut so that the bottom sides will be substantially flush with or a little below the inner surface of the panel, as shown at 15 in Fig. 9.

Referring now to Figs. 2 to 4 inclusive, the locking member 7 is preferably U-shaped having legs spaced apart a distance substantially equal to the distance between the bases of the grooves 14 in the shank of the escutcheon, and arranged to contact therewith as shown at 20 in Figs. 7 and 8 and thereby engage the escutcheon in non-rotatable relation. The locking member or clip 7 is preferably stamped and pressed from sheet stock and preferably given a spherical concavo-convex form with a substantially C-shaped rib or ridge 21 (see particularly Figs. 3 and 8) raised to a maximum height, and with the extreme corners 22 to 25 inclusive depressed to a maximum depth. The bottom points of the corners 22 and 23 are preferably sharpened whereby they tend to gouge the metal of the panel 6 and enter into a non-rotatable engagement with it when the locking device is forced into place as has been shown with more or less exaggeration in Figs. 5 to 8 inclusive.

The rearward edge of the clip is turned up to form an upstanding flange 26 by means of which the clip can be grasped or engaged by appropriate tools to facilitate its positioning with relation to the panel and escutcheon or its removal from locking engagement.

Referring particularly to Figs. 2, 3 and 8, it has been mentioned above that the most highly raised portion of the clip defines a C-shaped rib or ridge 21, within which and bounded by the ridge and by the inner sides of the legs of the clip are formed flat planular half moon shaped areas 27, shaped similarly to the upper sides of the recesses 14 and constituting seats for engagement with the upper sides of the recesses as at 28 in Fig. 8 whereby once the sides of the recesses seat on the areas 27, the clip cannot be removed without being forcibly distorted. It will be seen that when the clip is forced into place by a movement transversely of the shank of the escutcheon the upper sides of the recesses 14 come into contact with the inner sides of the legs of the U at about the points 29 (see Figs. 3 and 7).

The inner sides of the forward parts of the legs are preferably inclined downwardly a bit as at 30 (see Figs. 3 and 7) to facilitate engagement with the shoulders of the shank and to guide the mid-portion of the clip in its downward depressed movement while it is being forced transversely of the shank. It will be noted that as the legs pass into the recesses and are engaged by the upper sides thereof, the clip is flattened and the legs twisted slightly, and I have found it most desirable that the resiliency of the clip be such that a material pressure need be exerted to force the clip into its position of final engagement.

The clip is depressed a maximum amount in the course of its engagement while the upper sides of the recesses 14 contact with the areas or points 31 where the ridge 21 merges with the inclined surfaces 30. During this period of its movement the legs of the clip are rotated slightly along their longitudinal axes and their movement is provided for by reason of their initial lateral inclination as shown in Fig. 7. This lateral inclination of the clip follows from the general spherical concavo-convex formation of the clip as a whole and permits the stock of the clip and particularly of the legs thereof to spring or give in two directions. As the clip is forced transversely of the shank while the points 31 engage the upper sides of the recesses 14, the points or parts of the clip engaging the surface of the panel are spread a maximum distance from each other and also forced into scoring contact with the face of the panel. When the clip has been moved into full engagement, the end of the slot will contact with the cylindrical face of the shank and the points 31 will have snapped past or will snap beyond and upwardly from the level of the upper sides of the recesses 14, thereby permitting the upper sides of the recesses 14 to fully engage the planular seats 27 of the clip whereby the clip is securely held in fixed relation with relation to the shank of the escutcheon.

As mentioned above, while the clip is being forced into engagement, it is distorted a maximum amount while the points 31 are engaging the upper sides or shoulders of the recesses 14 and during this period of its movement, the points 22 to 25 or other parts engaging the panel are spread a maximum distance from each other and the points 22 and 23 form or scratch grooves in the path of movement of the clip on the face of the panel. After the points 31 pass beyond contact with the upper sides of the recesses 14, and the mid portion of the clip snaps upwardly, the points 21 to 25 are permitted to move toward each other slightly and at least part of the movement of the points 22 and 23 is lateral of the grooves which have been scored in the face of the panel with the result that these points, further cut the face of the channel and tend to establish themselves in the surface of the panel in a manner which very effectively resists both lateral and rotational movement. The clip being resilient exerts a constant force, urging these points into the face of the panel and also forcing the head of the escutcheon with an equal force into contact with the opposite face of the panel.

I prefer as stated above that the corner points 22 and 23 at the rear of the clip have sharp down-turned points for scoring the face of the panel. The forward corners 24 and 25 however are preferably sharp or rounded depending on the hardness or softness of the surface of the panel. In any event it is preferable that the forward panel contacting points be of such character that they primarily aid in slipping the clip into place. As a secondary consideration they may be sharpened to aid the rearward points in gripping the panel when its surface is so hard that relatively little scoring by the forward points will not delay or hinder the assembly.

It will be seen from the foregoing that while I have illustrated and described a preferred form of my invention and spoken particularly of the choke control escutcheon and the panel to which it is secured, and while I have illustrated and described a preferred form of clip or locking device for holding these parts together, it will be appreciated that my invention has many uses and applications beyond the one described in detail herein. It will be appreciated that this clip can be used to secure a bolt passing through any number of members and that in instances where a single pair of recesses might not be flush with the surface of the plate through which the bolt extends, it is then entirely feasible to provide a plurality of recesses spaced longitudinally and disposed at 90° from each other along the shank of the bolt so that the clip might enter the most desirable pair, depending on the thickness of the members through which the bolt passes. In view of the foregoing, I do not care to be limited to the particular form or application of my invention illustrated and described herein, or otherwise in the scope of my patent other than by the claims appended hereto when interpreted in the light of the existing state of the art and given the range of equivalents to which they are entitled.

I claim:—

1. A locking device having parallel legs and a back part joining said legs and a turned up edge along said back part for engagement with applying and removing tools, said device having a raised central part with a depressed seat portion for engagement with a member to be locked.

2. A locking device having parallel legs and a back part joining said legs and having a raised central part with a depressed seat portion in the raised part for engagement with a member to be locked.

3. A locking device comprising a resilient U-shaped washer having a raised central portion, the part forming the base of the U having an upturned edge in its mid-portion and having sharply downturned and pointed corners at its ends.

4. A locking device comprising a resilient U-shaped washer having a raised central portion, the part forming the base of the U having sharply downturned and pointed corners at its ends.

5. A locking device comprising a resilient U-shaped clip having a raised central substantially C-shaped ridge and depressed planular areas between said ridge and the inner side of the legs of the U.

6. A locking device comprising a resilient slotted clip having a raised portion adjacent the sides of the slot and spaced from the closed end thereof and having relatively depressed planular areas behind said raised portions and adjacent the inner sides of the slot.

7. A locking device comprising a resilient clip having a U-shaped slot, and having a raised central portion defining a C-shaped ridge surrounding the closed end of said slot and having depressed planular areas lying between said ridge and the inner edges of said slot.

8. A locking device comprising a resilient

U-shaped clip having a central zone struck up into a spherically concavo-convex portion lying above the plane defined by the extreme corners of said clip, said struck up portion having a central area lying in a plane parallel to the plane of said corners.

9. A locking device comprising a U-shaped clip struck up into a concavo-convex portion lying without the plane defined by its extreme corners, said struck up portion having a raised central C-shaped ridge and a depressed area encompassed by said ridge, said last named area lying in a plane parallel to the plane defined by the corners of the clip.

10. In combination an apertured plate, a member adapted to be secured in said plate having an enlarged head for engaging one face of the plate and a body part extending through said aperture and having grooves cut in its sides adjacent the other face of the plate, and a resilient locking member having spaced legs lying in said grooves and having a raised central portion engaging the body of said first member and having a plurality of sharp points engaging said plate.

11. In combination an apertured plate, a cylindrical member having an enlarged head adapted to engage one face of the plate on which said member is adapted to be mounted and a body part extending through an aperture in said plate and having grooves cut in its sides adjacent the other face of the plate, and a resilient locking member having spaced legs lying in said grooves and non-rotatably engaging said member and having a raised central portion engaging the body of said member and having a plurality of sharp points non-rotatably engaging said plate.

12. In combination a cylindrical member, said member having a recessed shank adapted to be secured to a member having a planular surface, and a resilient locking device for securing said members together comprising a resilient U-shaped clip with a raised middle portion resiliently urged into contact with the walls of the recesses of said shank and depressed exterior portions engaging the said planular surface at points at least one formed with a sharp projection to score said planular surface and form a groove in which said point is held in non-rotatable relation to said surface.

13. In combination, a member adapted to be secured in a plate having an aperture and presenting a face having a plane surface, said member being substantially cylindrical in form and having an enlarged head, a shank extending through said aperture and a recess adjacent the plane surface of the plate and presenting a surface parallel thereto, and a locking device for securing said member to said plate comprising an arched resilient clip having a slot, a raised central seat portion adjacent the slot and adapted to engage the parallel surface of said recess and base portions adapted to engage the face of the plate, and a projection adjacent the slot and adapted to engage the member to retain the clip in engagement with the member.

14. The combination of a member having an enlarged head adapted to be secured in a plate, said member having a shank extending through an aperture in said plate and having channeled recesses adjacent the surface of said plate with substantially parallel bases and parallel sides lying parallel to the plane of said plate with the upper of said sides spaced therefrom, and a resilient locking device for securing said member in fixed relation to said plate comprising a U-shaped clip having parallel legs engaging the bases of the recesses, said clip being generally spherically concavo-convex and engaging said plate at least at spaced points on its periphery, said clip having a raised middle portion in substantially the form of a C surrounding said shank and defining with the inner edges of said legs substantially half moon like planular areas constituting seats resiliently engaging the upper side walls of said recesses, said raised C-shaped portion terminating adjacent the edges of said legs adjacent the said seat portions and above the said seat portions whereby when the legs of said clip are forced through said recesses the clip is depressed a maximum amount when said raised portions engage the said upper side walls of said recesses and is permitted to snap back to a less distorted position when the said planular seats engage the upper side walls of said recesses.

15. The combination of a member having an enlarged head adapted to be secured to an apertured plate, said member having recesses cut in the shank adjacent the surface of said plate with the upper sides of the recesses spaced from said plate, and a resilient locking device for securing said member in fixed relation to said plate comprising a U-shaped clip having legs lying in said recesses and holding said clip in non-rotatable relation thereto, said clip being generally spherically concavo-convex having its central portion spaced from said plate and engaging the said upper sides of said recesses and having engagement with said plate at least at spaced points on its periphery, said clip being normally bowed upwardly a greater amount in idle position than when it is inserted in operative position whereby the points of engagement with said plane surface are forced apart and spaced greater amounts from each other in operative position than in idle position, at least certain of said points being downwardly turned and sharply pointed to gouge the plane surface as the clip is moved into operative engagement with said member and said plate to non-rotatably engage said surface.

16. In combination, an apertured plate, a member adapted to be secured in said plate, having an enlarged part for engaging one face of the plate and having a body part extending through said aperture, said body part having oppositely facing grooves adjacent the other face of the plate, and a locking device comprising a resilient slotted clip having a slot and a raised central portion adapted to be disposed in the said grooves of said body part and having a peripheral portion engaging the face of the plate whereby the clip tends to draw the member through the plate, said clip having at least a hump adjacent said slot adapted to contact with the wall of at least one of said grooves when the clip is moved relative thereto and positioned just beyond said groove when the parts are assembled to resist movement of said clip relative to the said body part of said member.

In testimony whereof I hereunto affix my signature this 29th day of April, 1930.

JOHN D. BALDWIN, Jr.